United States Patent [19]

Robinson

[11] Patent Number: 4,855,934
[45] Date of Patent: Aug. 8, 1989

[54] SYSTEM FOR TEXTURING COMPUTER GRAPHICS IMAGES

[75] Inventor: John Robinson, Sandy, Utah

[73] Assignee: Evans & Sutherland Computer Corporation, Salt Lake City, Utah

[21] Appl. No.: 914,971

[22] Filed: Oct. 3, 1986

[51] Int. Cl.$^4$ ................................................ G09B 9/08
[52] U.S. Cl. .................................. 364/521; 340/720; 340/723; 382/54
[58] Field of Search ....................... 364/518, 521, 522; 340/703, 720, 723, 744; 382/27, 54, 55

[56] References Cited

U.S. PATENT DOCUMENTS

| | | | |
|---|---|---|---|
| 4,017,985 | 4/1977 | Heartz | 364/521 |
| 4,466,123 | 8/1984 | Arai et al. | 382/55 |
| 4,623,880 | 11/1986 | Bresenham et al. | 340/744 X |
| 4,715,005 | 12/1987 | Heartz | 340/720 X |

*Primary Examiner*—Gary V. Harkcom
*Assistant Examiner*—H. R. Herndon
*Attorney, Agent, or Firm*—Nilsson, Robbins, Dalgarn, Berliner, Carson & Wurst

[57] ABSTRACT

Methods and apparatus for rendering a spacial contour texture map onto a generally planar polygon for display on the screen of a video monitor in a computer graphic system includes a memory for storing spacial distance measures between the individual texels of the contour texture map and a boundary on the contour texture map as well as an indentifier flag to define whether the texel is on one side of the boundary or the other. The contour texture map is applied to a modeled polygon by computing the intersection of each direction vector extending from an eyepoint through the center of a selected pixel to the contour texture map in a map space coordinate system. The projected size of a pixel on the contour texture map is also computed. The distance between the intersection point of each direction vector and the boundary of the contour texture map is computer and is projected onto the pixel space, that is, the screen of the display monitor. If the projected distance between the intersection point and the boundary in pixel space is on one side of the boundary, a first texture value is assigned to the pixel for display. If the projected distance from the intersection point to the boundary is on the other side of the boundary then a second texture value is assigned to the pixel. If the distance between the intersection point and the boundary is within a feathering region then a proportion texture value is assigned to the pixel for display on the screen.

10 Claims, 5 Drawing Sheets

SYSTEM FOR TEXTURING COMPUTER GRAPHICS IMAGES

BACKGROUND OF THE INVENTION

This invention relates to image generators such as those used in aircraft flight simulators for pilot training and in particular to methods and apparatus for incorporating contour texture maps in such image generators.

A critical component of flight simulators has been the image generator. Image generators display visual cues on a screen so that realistic visual images can be viewed by an observer from a viewpoint. Obviously, the visual cues projected by the image generator are most useful when they correlate directly with the real world.

The visual cues are generated by modeling real world counterparts and storing the models in the memory of the image generator. In general, the modeling occurs by dividing the scene to be modeled into polygons which are then combined to create the visual cues. Although even the smallest details can be modeled using polygons, the complexity of the model would result in enormous memory and computational requirements which would make real time systems impossible with currently available technology. Texture maps have been found to be an efficient alternative method of increasing scene complexity and hence realism. Indeed, the inclusion of texture into real time system has had a significant effect on both realism and optical flow.

In general, texture maps are maps which store a predefined irregular coloring, pattern or other predefined feature which is overlaid on a predefined polygon. The combination of the polygon and overlaid texture map then forms a composite which is displayed, pixel by pixel, on a typical video monitor. If the polygon is larger than the texture pattern being mapped onto it, the pattern simply repeats. If the polygon is smaller, the texture pattern is clipped.

There are a variety of techniques which might be used in a real time image generator to produce texture. One method consists of computing a texture pattern on the fly as a polygon is rendered and applying the pattern to the individual pixels affected by the polygon. Such a texture pattern is typically an evaluation of one or more mathematical functions such as a sum of sine waves of varying frequency and direction.

Another way of producing texture is through the use of texture maps. A texture map is a two-dimensional array of texture values. The map is computed off-line and then stored in a texture map memory in the image generator. As a textured polygon is rendered, an address into the texture map is calculated for each pixel affected by the polygon. The texture value or "texel" associated with a particular pixel is then used to modify the final intensity or color of the pixel. This method of producing texture requires more memory than the first method, but provides increased flexibility in that the texture patterns are independent of the image generator hardware.

Texture patterns when applied to a polygon surface, modify or modulate some attribute of that surface. The modulation of each attribute will result in a different effect on the screen. Consequently, texture maps have been used to modulate the intensity of the polygon to portray surface roughness or change of the reflectivity of the polygon. Texture maps can also modulate the color of the polygon. For example, a polygon with areas of green and brown created by texture could represent patches of grass or dirt. Still another attribute of the polygon which can be modified by a texture map is its transparency. A texture map affecting transparency can be used to create opaque and translucent areas on the polygon to display features such as smoke or clouds.

Recent developments have made use of transparency texture to modify the shape of polygons. Such maps may be viewed as a "cookie cutter" to remove portions of the polygon allowing complex shapes to be cut.

Traditional methods of creating and storing texture maps required direct storage of the transparency, color or intensity value for each texel. However, this traditional texture map method is inadequate for portraying hard edge boundaries such as occur in contour texture maps over a wide dynamic range of image sizes. For example, when the image mapped is small, the edges either scintillate or the object to e created by the contour map would have to be prematurely removed from being displayed. Consequently, the present invention provides a new type of contour texture map. Instead of storing color, intensity or transparency data directly, a contour map in accordance with the present invention consists of spacial distances from each map texel to the boundary between, for example, an opaque and transparent area. A flag such as a positive or negative sign associated with each spacial distance, indicates whether the texel is in, e.g. an opaque or transparency area. The present invention computes the proper transparency (or alternatively color or intensity) values for the contour maps from the encoded spatial boundary data, taking into account the polygon's distance and slant angle.

SUMMARY OF THE INVENTION

A contour texture map is rendered onto a generally planar polygon for display on a video monitor in a computer graphic system by initially defining the screen of the video monitor to consist of a plurality of pixels (k) in a pixel space coordinate system and a contour texture map to consist of plurality of texels (i) in a texture space coordinate system. The method of rendering includes the initial step of generating a spacial contour texture map.

The spacial contour texture map is generated by defining first and second areas characterized respectively by a first texture value V1 and a second texture value V2. The texture values may be color, transparency, intensity or any other texture characteristic. The first area and the second area are divided by a boundary. For each texel of the contour texture map, the shortest spacial distance between the texel and the boundary is next determined. Associated with each distance measure is either a first identifier indicating the texel is in the first area and a second identifier indicating the texel is in the second area. The contour texture map is completed by storing the determined spacial distance and the associated identifier for each texel.

A polygon defined by a modeler in a model space coordinate system is preferably aligned with the contour texture map in the map space coordinate system. Specifically, the offset and orientation of the XY plane of the texture map coordinate system in which the texture map lies is modeled to closely match the plane of the polygon in the model space coordinate system.

A measure of the size of a pixel (PPS) projected onto the contour map is next computed. For each pixel K of the display, a direction vector is defined extending from the eye point (i.e., the point at which the display is viewed by the observer) through the center of the selected pixel. The intersection point, I, between an extension of each such direction vector and the contour texture map in the texture space coordinate system is then identified. The shortest distance in texture space from the intersection point I to the boundary, that is the texture space distance Td, is determined. The texture space distance Td is then projected onto pixel space to define a pixel space distance Pd according to the relationship $$Pd = Td/PPS$$

where "S" is a predetermined width of a pixel.

Finally, for each pixel, a texture value, Tv for display is defined according to the relationship $$Tv = V1 \text{ for } Pd < -F$$

$$Tv = (Pd/F + \tfrac{1}{2})(V2 - V1) + V1 \text{ for } -F < Pd < F$$

$$Tv = V2 \text{ for } Pd > F$$

where F is a predefined constant defining the width of a feathering region in the pixel space coordinate system along the boundary.

BRIEF DESCRIPTION OF THE DRAWINGS

A complete understanding of the invention and its advantages may be gained from a consideration of the following description of the preferred embodiments taken in conjunction with the accompanying drawings in which.

DETAILED DESCRIPTION

Figures 1, 5:
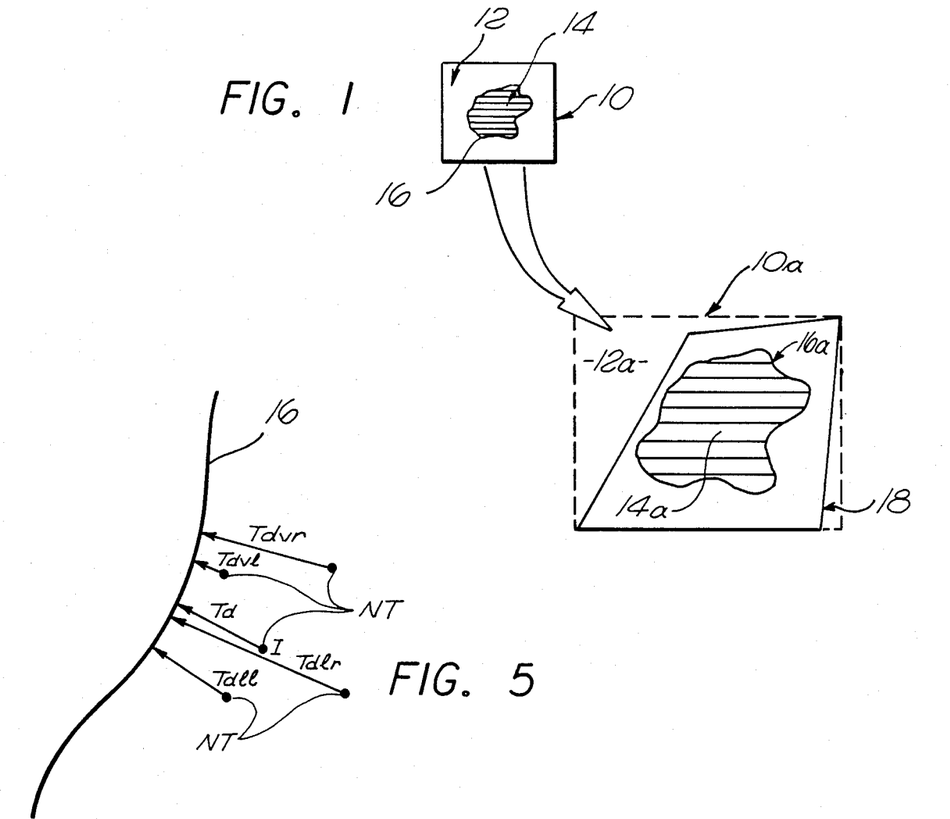
FIG. 1 is an illustration showing a contour texture map applied to a polygon.
FIG. 5 illustrates the computation of Td using bilinear blending.

Referring initially to FIG. 1, an illustrative contour map 10 to be stored as data in a memory of an image generator (not shown) consists of a first area region 12, a second area region 14 and a boundary 16 between the first region 12 and second region 14. The first region 12 has a first transparency, color or intensity value (V1) associated therewith and the second region 14 has second contrasting transparency, color or intensity value (V2) associated therewith. The map may be formed as a number of discrete, symmetrically spaced texels in a predefined texture space coordinate system analogous to the pixels comprising a display of a video monitor.

During modeling of visual cues to be displayed on a video monitor, various features are modeled by one or a combination of polygons such as the polygon 18 in FIG. 1. In order to generate complex or irregular shapes within the polygon 18, data for a contour map, such as map 10, whose boundary is created to form the desired complex shape, is superimposed over polygon 18. The result is a superimposed combination of the contour map shown as map 10a the polygon 18. Each pixel on the video display which is affected by the polygon 18 will also be affected by the texture value from the represented data of contour map 10a with the bondary 16a which is superimposed on the polygon 18. Hence, the pixels affected by the second region 14a of the map 10a are within the polygon 18, will correspondingly modify the pixel as displayed on the video monitor. Likewise, the portions of the first region which overlay the polygon 18 will affect the pixels in those regions and those pixels will be likewise modified but in a different way from the pixels which overlay both the polygon 18 and the second region 14a. Of course, if the first region 12a represents transparency then the "modification" will be "no change" and the corresponding pixels will not change.

Conventionally, texture maps such as the contour texture map 10 in FIG. 1 have been stored by simply assigning and storing, in a direct way, the intensity value, color value or transparency value of each texel in the contour map. The present invention provides a novel contour texture map wherein the values stored in association with each texel are not the intensity, color or transparency value, but rather are spacial distances representing, for example, the shortest distance between each texel and the boundary. Additionally, each texel has stored in association with this spacial distance measure a flag or other identifier characteristic to define whether a texel is on one side of the boundary or the other. The most convenient "flag" is a positive or negative sign designation. Hence, texels on one side of the boundary would have a negative sign, whereas texels on the opposite side of the boundary would have a positive sign.

Figure 2:
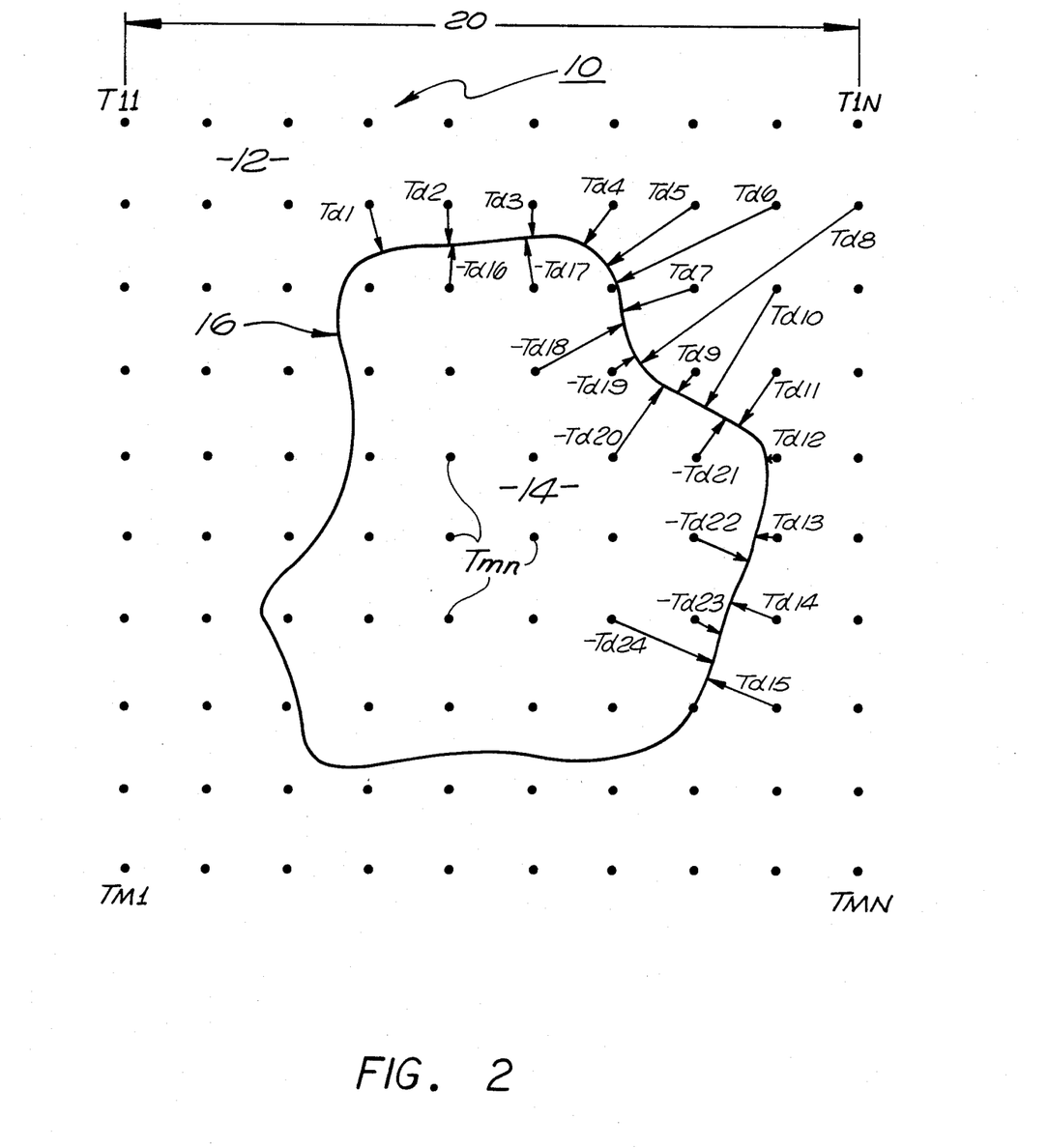
FIG. 2 illustrates a spacial contour texture map in accordance with the invention.

Referring more specifically to FIG. 2, generating the contour texture map 10 starts with some representation of a boundary between two area types such as the first region 12 and the second region 14 on a conventional coordinate array, i.e. rows T1-TM in columns 1-N. Note the illustrated points T11, T1N, TM1 and TMN. The map representation could be a series of points through which the boundary passes, or it could be a conventional bit map of the silhouette of areas. The bit map, if used, should be higher resolution than the texture map that will be created from it.

Each texel (Tmn) of the contour texture map has a map region identifier which, in the present illustration, is simply a positive or negative sign. Therefore, for each texel (Tmn) of the contour texture map, there is stored a signed distance Tdi (specifically Td1-Td24). The spacial distance value Tdi for each texel may be found by simply searching the list of points on the bit map for the closest edge and solving that distance. The sign of the distance indicates the area in which the texel resides. A value of zero would indicate that a texel is exactly on the boundary 16. In the illustration of FIG. 2, the texels Tmm in the second region 14 may be represented by a negative distance, the texels Tmm in the first region 12 may be represented by a positive distance. In the preferred embodiment, the distance should be in "map lengths" where a map length is the length 20 (T11–T1N) of the contour texture map.

The contour texture map 10, in accordance with the invention and illustrated in FIG. 2, consequently consists of a multiplicity of spacial distance measures (Tdi), one for each texel (Tmn). Data representative of the spacial distance measures Tdi are then stored in a memory in association with the map region identifier to define the spacial contour texture map 10.

Figure 3:
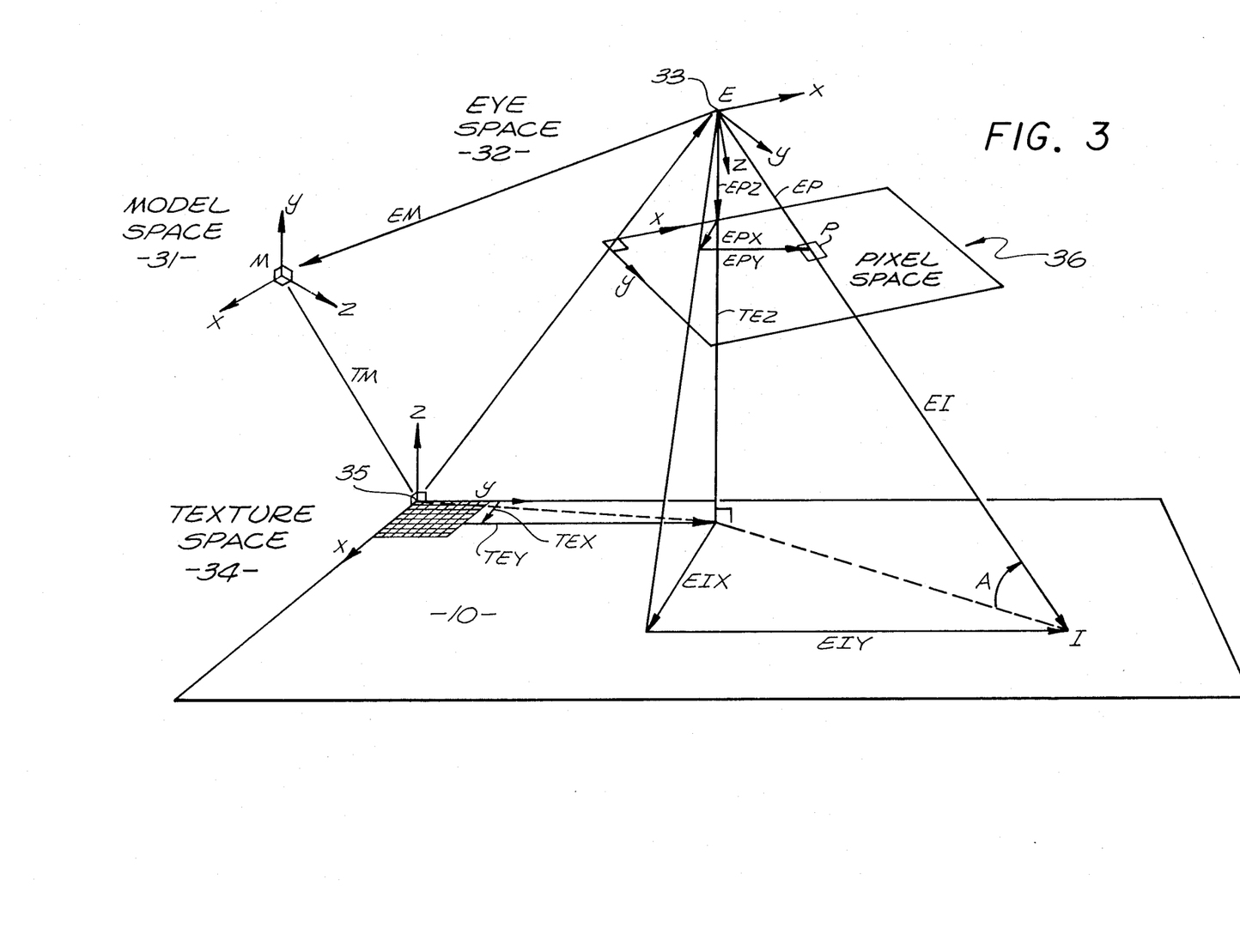
FIG. 3 illustrates the various coordinate systems which are considered in the computation of the intersection point I of the direction vector for each pixel, with the contour texture map in the texture space coordinate system.
Figure 4:
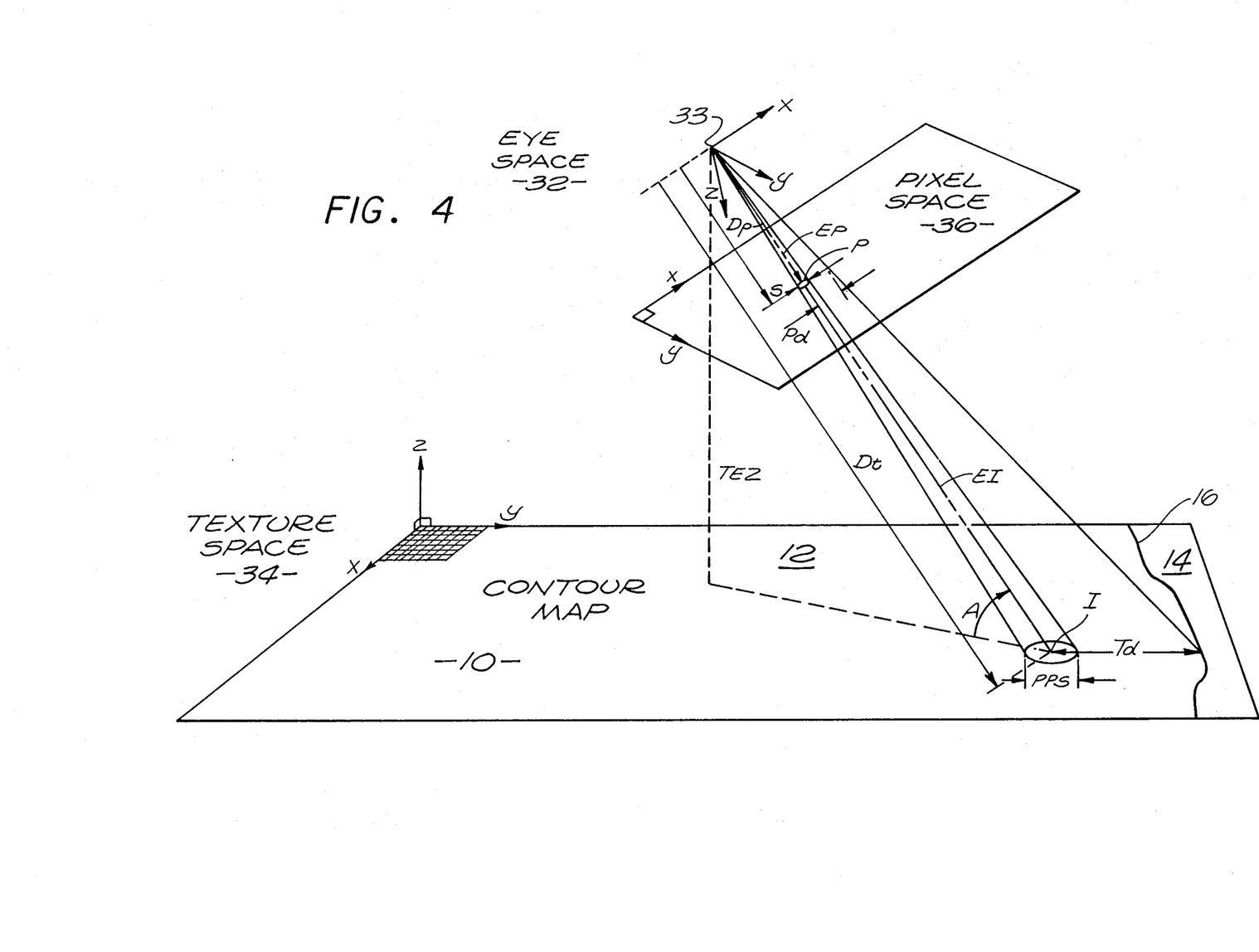
FIG. 4 illustrates the relationship between pixel space and texture space, the projection of Td onto pixel space to obtain Pd and the computation of PPS.

After the contour texture map has been created and stored, it must be combined with a polygon and displayed. There are any number of ways to render polygons with map texture on them that behave properly in perspective and are compatible with contour texture. In general, the rendering involves the application of transformation matrices as well known in the prior art. Specifically, the subject of transformations is treated in detail in the book, PRINCIPLES OF INTERACTIVE COMPUTER GRAPHICS, Newman & Sproull, published 1979 by McGraw-Hill, Inc. Using such techniques in accordance herewith, the data is converted so that the contour texture map 10, specified for example by the distances Td1–td24 in texture space, is projected in pixel space along with the polygon 18 (FIG. 1) to be textured as a display image component. One method of data conversion is described referring to FIG. 3 which shows the following coordinate systems: model space 31 which is in reference coordinate system for the entire model, eye space 32 with origin at the viewpoint and is oriented such that the Z axis is in the direction the viewer is looking, and texture space 34 which has an arbitrary origin 35 and orientation except that the XY plane of the texture space map 10 should be substantially the same as the plane of the polygon. Coordinates are indicated for each system in values x, y and z. In addition there is the pixel surface 36 which is defined in eye coordinates. For simplicity, it is shown here as a plane that is parallel to the XY plane of the eye coordinate system but spaced some distance from the origin 33 in which the image of the polygon with its texture will be projected. FIG. 4 also shows the relationship between the pixel space 36 and the texture space of the contour map 10. The pixel surface is divided into a regular array of rectangles called pixels that correspond to the number of picture elements across and the number of scan lines down the screen. One pixel is indicated by the point P.

The texture space 34 coordinate system is defined by the modeler by specifying an offset vector TM and a 3×3 rotation matrix [mt] (not shown) which describe its position and orientation, respectively. As stated earlier, the XY plane of the texture space is (map 10) constrained to be in the same plane as the polygon (pixel space 36) on which the texture is being mapped. Similarly, the eye space coordinate system is defined by specifying the offset vector EM and the rotation matrix [em] which are derived from the simulated vehicle's position and heading, pitch and roll relative to the model origin.

The process of forming the image of the textured polygon starts in the conventional manner. First the projected outline of the polygon is found on the pixel plane (not shown). This determines which pixels are affected by that polygon. A color must be determined for all of those pixels that are based on a number of things, one of which is the texture map.

In order to display the contour texture map-polygon composite in pixel space, the intersection of an extension of each direction vector to the XY plane of the texture space coordinate system is determined. The direction vector is the vector extending from the origin 33 of the eye space coordinate system 32 through the center of the selected pixel P affected by the polygon.

As previously noted, the spacial contour texture map is modeled as a two-dimensional map lying in the XY plane of its own coordinate system, i.e., the texture space coordinate system 34, with one corner at the origin 35. The offset and orientation of the XY plane of the texture space coordinate system is preferably modeled to closely match the plane of the polygon to achieve the preferred effect in accordance with the invention.

The first step is to locate, for each pixel, the intersection point I (FIG. 3, lower right) between the direction vector and the XY plane of texture space at an angle A. The intersection may be determined by first finding the two-dimensional projection on the texture plane, of the TE vector which is the vector from the origin 35 of the texture space coordinate system 34 to the origin 33 of the eye space coordinate system 32. These components of that projection are defined in FIG. 3 as TEX and TEY. The vertical component of the TE vector, TEZ, is the perpendicular distance from the origin 33 of the eye space to the XY plane in texture space 34. The TEZ component is consequently the height of the observer's eye above the plane of the texture map 10. The texture plane vector (TEX, TEY) is independent of pixel direction and may be used over the entire polygon surface.

TE, in the texture space coordinates (denominated TEt), is formed according to the following equation:

$$TEt = [mt] \times (TMm - EMm)$$

where:

EMm is the eye vector from the origin 33 of eye space to the origin 31 of model space 30 defined by the modeler in modeler space coordinates, TMm is the offset vector between the origin 35 of texture space and the origin 31 of the model space and is defined by the modeler in model space coordinates, and:

[mt] is a model-to-texture space transformation matrix also predefined by the modeler.

Another involved vector, whose computation is defined hereafter, is the EI vector (expressed in texture space coordinates) which is the vector from the origin 33 of the eye space coordinate system 32 through the center of a typical pixel P to the intersection point I. The EI vector has a two-dimensional projection in the texture plane (EIX, EIY). From FIG. 3, it can be seen that the vector sum of the TE and EI vectors defines the intersection point I. Consequently, it is only necessary to compute the EI vector components EIX and EIY. This may be accomplished using principles of similar triangles once the EP vector is computed resolving EPX and EPY.

The EP vector for each pixel is different and is, for each pixel, a direction vector (also called pixel vector) to the center of a selected pixel P from the origin 33 of the eye space coordinate system 32. The pixel vector EP is defined in the eye space coordinate system. The projection of the EP vector to the texture space defines the EI vector. Thus, as suggested above, the object is to find the intersection I of the projection of EP (vector EI) surface of the polygon in the texture coordinate system 34. Initially, the EP vector is defined in eye space (denominated EPe). The defined EP vector is then transformed into texture space according to the equation:

$$EPt = [et] * EPe$$

Where [et] is composite transformation matrix from eye space (e) to texture space (t) and is computed by the formula:

$$[et] = [mt] \times [em]$$

The model space (m) -to-texture space (t) matrix [mt] is generated by the modeling system and is therefore conventionally available. The matrix [em] is the inverse of the [me] rotation matrix and is also predefined and available. The components of EP are defined in FIG. 3 to be EPZ, EPX and EPY. The coordinants of the intersection point I relative to the point on the polygon directly below the origin of the eye space can be found using similar triangles geometry. Thus:

$$EIX = TEZ * EPX / EPZ$$

$$EIY = TEZ * EPY / EPZ$$

All that remains is to find this point relative to the texture origin. This is done by adding the other two components of the TE vector to the EI components:

$$TIX = EIX + TEX$$

$$TIY = EIY + TEY$$

Hence, the intersection point I can be readily computed in the texel space coordinate system.

In addition to finding the intersection point I, the size of the pixel P projected onto the surface of the polygon must also be determined. The projected size relative to the texture map length is used to filter the texture.

Referring now in greater detail to FIG. 4, the projection of a typical pixel P having A "diameter" S, onto the contour map 10 in texture space 34 may be approximated by projecting a circular cone having an apex at the origin 33 of the eye space 32 and just bonding the pixel P being projected. At the intersection point I of this cone with the polygon surface mapped in texture space 34 there is generally an ellipse. However, a sufficiently accurate approximation is that the projected ellipse is a circle with a radius equal to the major axis of the ellipse. The radius of this projected "circle" (major axis of the ellipse) is defined to be PPS. PPS may therefore be computed according to the following equation:

$$PPS = S * Dt/Dp * 1/Cos(A)$$

Where:
S is the radius of the projected circular cone at the pixel;
Dp is the distance from the origin 33 of the eye space to the pixel P;
Dt is the distance from the origin 33 of the eye space to the intersection point I; and
A is the angle between the EP vector and the surface 10.

The PPS equation may be calculated by recognizing that Dt/Dp (FIG. 4) is equal to TEZ/EPZ (FIG. 3), thus, both known values. Also, referring to FIG. 3, if EP is unit length, Cos (A) is the product of EP with the surface normal to the polygon. This can be shown to be just EPZ. Consequently, the equation for PPS becomes:

$$PPS = S * TEZ/(EPZt)^2$$

Summarizing, once the EP vector is defined, all other quantities having been previously defined by the modeler, the intersection point I and the projected size of a pixel, PPS, can be computed and are available to enable projection of the polygon and the contour texture map in texture space onto pixel space, which is the desired result.

As previously described, the contour texture maps, according to the invention, are now spacial maps which are represented by the distance from each texel to the closest edge of the boundary with a sign flag indicating on which side of the boundary the texel is located. The distance is measured in the plane of the texture map and preferably has units of map elements where a map element is the distance between adjacent texels. To filter the contour boundary, the distance Pd from the pixel to the projection of the contour boundary in pixel space must be known. PPS which has units of map lengths per pixel can be used to approximate that projected distance.

Referring to FIG. 4, it can be seen that $$Pd = Td * M/PPS$$

Pd is the distance from the center of the pixel P to the contour edge projected from texel space to pixel space;
Td is the distance in map elements from the projected pixel center (I) to the contour boundary and is a result of map lookup to be described hereafter; and
M is a constant ratio between units of map length and units of map elements.

Normally the intersection point I will not coincide with one of the discrete texel points. One method of computing the value Td is to use the spacial distances of the nearest texels surrounding the intersection point I. Referring to FIG. 5, the intersection point I is used to identify the four nearest texels NT. A texel distance selector then provides the spacial distances of the nearest stored texel values Tdur, Tdul, Tdlr and Tdll, to a conventional bilinear blending apparatus which computes the distance value Td from the intersection point I to the boundary 16. The technique of bilinear blending is well known and will not be described further. Of course, techniques to determine a value of Td for an intersection point I which does not fall on a texel point other than bilinear blending are possible without departing from the present invention.

Once the address for the intersection point I is known, the distance PPS calculated (FIG. 4) distance value Td from the intersection point I to the boundary 16 determine, the contour map is rendered by projecting the value Td in map elements onto pixel space. This projection for each pixel is accomplished using the relationship $$Pd = Td * M/PPS$$

The last step is to associate a color value, transparency value or other texture value Tv for each pixel. As described above, Pd will have an associated flag, such as a positive or negative sign, indicating on which side of the boundary the intersection point I, projected in pixel space, lies. According to one embodiment of the invention, a positive value indicates that the pixel is on one side of the boundary and a selected texture value Tv, such as transparency or other selected texture value, will be assigned. A negative Pd value indicates that the pixel is on the opposite side of the boundary and a second texture Tv, such as a different transparency value, will be assigned for that pixel.

Figure 6:
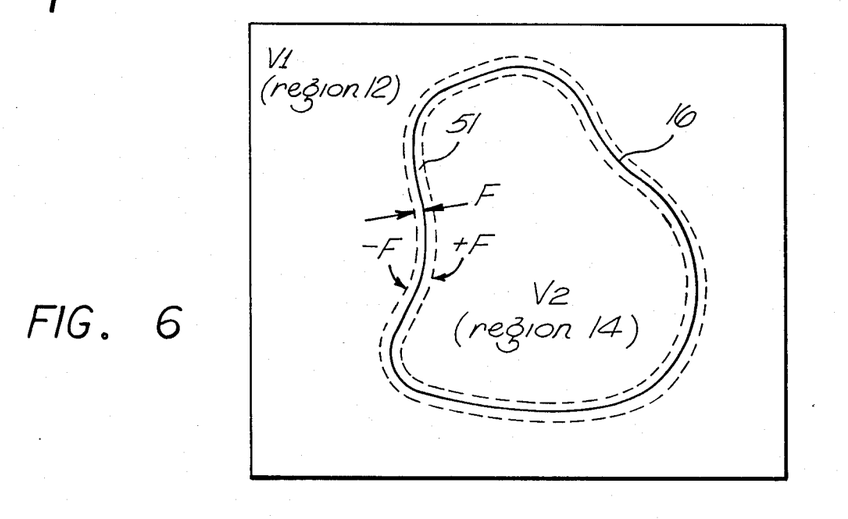
FIG. 6 illustrates a contour texture map incorporating a feathering region of width F on either side of the boundary between a first area of the contour texture map and a second area of the contour texture map.

Referring to FIG. 6, in the preferred embodiment of the invention, the boundary of the contour texture map is provided with a feathering band 51 which extends on either side of the boundary 16. If the pixel is in the feathering band, then a blended texture value is computed and assigned to that pixel. A pixel is determined to be in the feathering band by comparing the value Pd (FIG. 4) for that pixel against the predefined width of the feathering band 51.

According to a preferred embodiment of the invention, Tv may therefore be selected for each pixel k by applying the relationship $$Tvk = V1 \text{ for } Pdk < -F$$

$$Tvk = (Pdk/F + \tfrac{1}{2})(V2 - V1) + V1 \text{ for } -F < Pdk < F$$

$$Tvk = V2 \text{ for } Pdk > F$$

where:

F is the preselected constant defining the width, in pixel space, of the feathering band on each side of the boundary between the first and second areas 12 and 14

Consequently, as illustrated in FIG. 6, the feathering band extends from $-F$ to $+F$ and has a width 2F which is constant in pixel space. In this way, the sharpness of the edge is maintained over the full range of image sizes. Further, if bilinear blending is employed during the texture map lookup, the boundary will be sharp even when a texel is much larger than a pixel, that is, when PPS is less than one.

The total feathering band width 2F is preferably selected to be a width of $\tfrac{1}{2}$ pixel or less. The selection of a feathering band 51 meeting this criteria eliminates scintillation at the contour boundary because as the contour boundary moves across the screen, each pixel affected by that boundary gradually changes, for example, from transparent to opaque or opaque to transparent.

Figure 7:
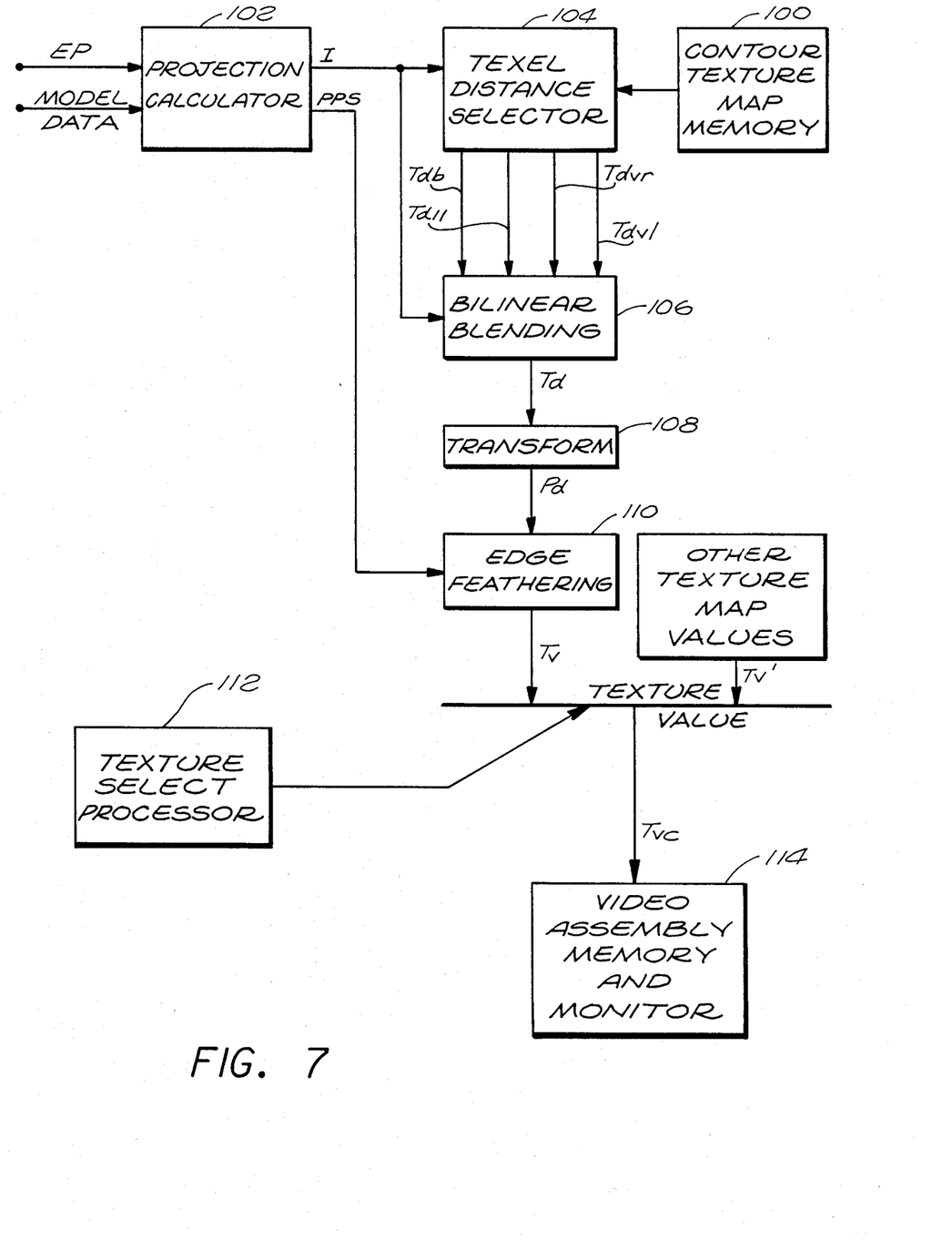
FIG. 7 is a block diagram of a contour texture map subsystem in accordance with the invention.

Referring to FIG. 7, a simplified block diagram of a portion of an image generator which would incorporate contour texture mapping in accordance with the invention includes a contour texture map memory 100 in which the spacial contour texture map data as previously described is stored. The map consists of a plurality of texels which may be represented as memory storage locations or addresses. The content of each memory location is a spacial distance with an associated plus or minus sign. A projection calculator means 102 receives predefined model data as well as the predefined or precomputed eye-to-pixel vector EP. This data is predefined by the modeler or otherwise conventionally available in prior simulator systems. The model data includes the transformation from model space to texture space, and the transformation from model space to eye space so as to enable calculation of the intersection point I. This modeling data is provided to the projection calculator 102 in a conventional way. The projection calculator computes the intersection point I and the pixel projection size PPS in texture space. The location of the intersection point I, which is the extension of the EP vector to the contour texture map, is coupled to a texel distance selector 104 which is also coupled to the contour texture memory 100. The texel distance selector 104 identifies the four texels immediately surrounding the intersection point I in any of several conventional ways and outputs the four texel distance values, Tdlr, Tdll, Tdur and Tdul (see FIG. 5) to a bilinear blending apparatus 106.

The bilinear blending apparatus 106 also receives the intersect point I and then operates in a conventional manner to generate, for each pixel, a single spacial distance measure Td which is the distance from the intersection point I to the contour boundary in texel space. This distance value Td is then coupled to a transform means 108 which is also coupled to the projection calculator 102 to receive the value PPS. The transform means 108 projects the distance measure Td onto pixel space to define a second measure Pd according to the relationship $$Pd = Td * M/PPS$$

as previously described.

The spacial distance measure output Pd of the transform means 108 is coupled to a texture value computer 110 which selects a texture value Tv, such as a color or a transparency value, for each pixel to be displayed in accordance with the previously described relationships. The resultant texture value Tv from the texture value computer 110 is combined with other texture map values Tv from suitable apparatus 115 for each pixel under control of a texture select processor 112. The composite texture value Tvc is sent to a conventional video assembly memory and monitor 114 for display using known methods and apparatus.

Other options and variations are also possible without departing from the spirit of the invention. For example, to produce variations in the displayed texture, an additive offset may be applied to the contour texture map before Pd is calculated. This has the effect of changing the size of the object to be displayed without changing its shape. The offset applied can come from a modulation map. Thus, if a contour texture map is scaled small relative to a polygon and the modulation map, each object displayed using the contour texture map will vary slightly from the next.

What is claimed is:

1. A method for contour texturing a specified polygon to be viewed in defined eye point space using a computer graphics system of pixel resolution, said method comprising the steps of:

specifying a texture rendering in texture space having a first area region, a second area region and a boundary between the first and second area regions;

specifying a multiplicity of symmetrically spaced discrete points (texels) on the specified texture rendering:

measuring the shortest distance between each texel within the first and second area regions and the boundary between to resolve a distance measure for each texel;

assigning a first identifier with the distance measure of each texel in the first area region;

assigning a second identifier distinct from said first identifier with the distance measure of each texel in the second area region;

storing data representative of the spatial distance measure and associated identifiers for each texel to provide contour texture map data; and converting the contour texture map data to the eye point space for combined display with said polygon by the computer graphics system as a textured polygon.

2. A method according to claim 1 wherein said distance measures are resolved in texture space and wherein said step of converting data includes aligning said contour texture map data in texture space with the plane of said polygon.

3. A method according to claim 1 wherein said step of converting data further includes computing a measure of the side of a pixel PPS for said display projected to texture space, locating a defined projection point I of said pixel in texture space, and determining the shortest texture space distance Td from said point I to said boundary as said distance measure.

4. A method according to claim 1 wherein said distance measure for each pixel is formulated in texture space as a texture space distance Td and wherein said step of converting the contour texture map data includes converting values of Td to pixel space distances Pd according to the relationship $Pd = Td/PPS$ where PPS is a measure of the side of a pixel projected in texture space.

5. A method according to claim 1 including the further steps of:

defining a feathering band extending on both sides of said boundary having a predefined width, 2F;

selecting said first identifier as a signed value for a distance measure when a pixel space distance Pd is in the first area region V1 and not in said feathering band;

selecting said second identifier as a signed value for a distance measure when a pixel space distance Pd is in the second area region v2 and not in said feathering band;

selecting a first texture value for a pixel value Tv according to the criterion $Tv = V1$ for $Pd < -F$;

selecting a second texture value for a pixel value Tv according to the criterion $Tv = V2$ for $Pd > F$; and selecting a proportioned texture value for display according to the criterion $Tv = (Pd/F + \frac{1}{2})(V2 - V1) + V1$ for $-F < Pd < F$.

6. A method according to claim 5 wherein said distance measures are resolved in texture space and wherein said step of converting data includes aligning said contour texture map data in texture space with the plane of said polygon.

7. A method according to claim 5 wherein said step of converting data further includes computing a measure of the size of a pixel PPS for said display projected to texture space, locating a defined projection point I of said pixel in texture space, and determining the shortest texture space distance Td from said point I to said boundary as said distance measure.

8. An apparatus for texturing computer graphics images defined by polygon data in a predefined model space coordinate system by modifying said polygon data in accordance with texel data, the texture polygons to be displayed and viewed from an eye point in an eye space coordinate system on a display screen and defined by a plurality of pixels in a predefined pixel space coordinate system, the eye space being related to the screen space by a plurality of predefined direction vectors EP, each extending from the eye point through the center of a selected one pixel, the apparatus comprising:

means for supplying signal-represented texel data specifying a contour texture map by a plurality of discrete symmetrically spaced texels, a first area region of said map being defined by a first texture value and a second area region of said map defined by a second texture value, the first and second area regions separated by a boundary, the texel data defining the contour texture map by a plurality of spatial distance measures, one distance measure associated with each texel, each distance measure defining a spatial distance from the texel to the boundary;

projection calculator means for receiving a predefined direction vector, identifying the intersection point I of that direction vector EP with the contour texture map and computing the projected size (PPS) of a pixel on the contour texture map;

means coupled to the projection calculator and to receive said signal-represented texel data for computing a texel distance value Td between the intersection point I and the boundary in the texture coordinate system, the texel distance value having a first identifier associated therewith when the intersection I is in the first area and a second identifier associated therewith when the intersection point I is in the second area; and texture value computer means for selecting a texture value for each pixel for display, under the control of said first and second identifiers.

9. An apparatus according to claim 8 further including: means coupled for receiving the value Td and the value PPS and projecting the texel distance value Td onto the pixel space coordinate system to define a pixel distance value Pd for each pixel; and wherein said textured value computer means further includes means for selecting for each pixel, a first texture value for display when the pixel distance value Pd is in the first area and is not in a predefined feathering band extending a predefined width along either side of the contour texture map boundary, selecting a second texture value for display when the pixel distance value Pd is in the second area and is not in the feathering band and selecting a proportioned texture value which is a function of the first texture value and the second texture value when the pixel distance value is in the feathering band.

10. The apparatus of claim 9 wherein, for each pixel, the pixel distance value Pd is defined to be $Pd = Td/PPS$.

* * * * *

UNITED STATES PATENT AND TRADEMARK OFFICE
CERTIFICATE OF CORRECTION

PATENT NO.   :  4,855,934
DATED        :  August 8, 1989
INVENTOR(S)  :  John Robinson It is certified that error appears in the above-identified patent and that said Letters Patent is hereby corrected as shown below:

| Column | Line | |
|---|---|---|
| Title Page: Abstract | 16 | "computer" should be --computed--; |
| 2 | 17 | "e" should be --be--; |
| 4 | 13 | insert --which-- after "10A"; |
| 4 | 65 | "Tmm" should be --Tmn--; |
| 4 | 66 | "Tmm" should be --Tmn--; |
| 4 | 68 | after "be in" insert --units of--; |
| 5 | 29 | insert --33-- after "origin"; |
| 5 | 52 | "is (map 10)" should be --(map 10) is--; |
| 6 | 67 | insert --with the-- after "EI)"; |
| 7 | 7 | insert --a-- after "[et] is"; |
| 7 | 44 | "bonding" should be --bounding--; |
| 7 | 67 | insert --are-- after "both"; |
| 8 | 54 | insert --and the-- after "(FIG. 4)"; |
| 8 | 56 | "determine" should be --determined--; |
| 9 | 28 | insert --along the boundary.-- after "12 and 14"; |
| 11 | 13 | "1" should be --2--; |
| 11 | 27 | "side" should be --size--; and |
| 11 | 54 | "5" should be --6--. |

Signed and Sealed this

Thirty-first Day of July, 1990

*Attest:*

HARRY F. MANBECK, JR.

*Attesting Officer*     *Commissioner of Patents and Trademarks*